United States Patent
Sato

(10) Patent No.: US 10,523,932 B2
(45) Date of Patent: Dec. 31, 2019

(54) APPARATUS FOR VEHICLE-MOUNTED CAMERA CALIBRATION AND METHOD FOR VEHICLE-MOUNTED CAMERA CALIBRATION

(71) Applicant: SUBARU CORPORATION, Tokyo (JP)

(72) Inventor: Shingo Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/971,742

(22) Filed: May 4, 2018

(65) Prior Publication Data

US 2018/0352217 A1 Dec. 6, 2018

(30) Foreign Application Priority Data

Jun. 2, 2017 (JP) .................................. 2017-110493

(51) Int. Cl.
| | | |
|---|---|---|
| *H04N 17/00* | (2006.01) | |
| *B60R 11/04* | (2006.01) | |
| *B60R 1/00* | (2006.01) | |
| *B60R 11/00* | (2006.01) | |

(52) U.S. Cl.
CPC ............ *H04N 17/002* (2013.01); *B60R 1/002* (2013.01); *B60R 11/04* (2013.01); *B60R 2011/004* (2013.01); *B60R 2300/70* (2013.01)

(58) Field of Classification Search
CPC ....... H04N 17/002; B60R 1/002; B60R 11/04; B60R 2011/004; B60R 2300/70
USPC ........................................................ 348/187
See application file for complete search history.

(56) References Cited

U.S. PATENT DOCUMENTS

| | | | | |
|---|---|---|---|---|
| 8,489,353 | B2* | 7/2013 | Raphael | G06K 9/00791 702/86 |
| 2011/0129154 | A1* | 6/2011 | Shimodaira | G06T 7/80 382/190 |
| 2012/0262544 | A1* | 10/2012 | Damera-Venkata | G03B 35/26 348/43 |
| 2014/0320658 | A1* | 10/2014 | Pliefke | B60R 1/002 348/148 |
| 2017/0261315 | A1* | 9/2017 | Yamaguchi | G01C 21/28 |
| 2017/0287168 | A1* | 10/2017 | Jeong | G06T 3/4038 |
| 2017/0345159 | A1* | 11/2017 | Aoyagi | G06T 7/207 |

FOREIGN PATENT DOCUMENTS

| | | | | |
|---|---|---|---|---|
| JP | 2000113375 | A | * 4/2000 | |
| JP | 2004102860 | A | * 4/2004 | |
| JP | 2007261463 | A | * 10/2007 | G06K 9/00791 |
| JP | 2013-131885 | A | 7/2013 | |

* cited by examiner

*Primary Examiner* — Michael Lee
(74) *Attorney, Agent, or Firm* — Troutman Sanders LLP

(57) ABSTRACT

An apparatus for vehicle-mounted camera calibration includes a floor and a display. An automobile is to be stopped in a predetermined stopping area on the floor. The display is disposed outside the predetermined stopping area on the floor. The display is configured to present a display pattern for calibration of a vehicle-mounted camera mounted in the automobile. The display is configured to change the display pattern in accordance with specifications of the automobile and specifications of the vehicle-mounted camera.

16 Claims, 4 Drawing Sheets

APPARATUS FOR VEHICLE-MOUNTED CAMERA CALIBRATION AND METHOD FOR VEHICLE-MOUNTED CAMERA CALIBRATION

CROSS-REFERENCE TO RELATED APPLICATIONS

The present application claims priority from Japanese Patent Application No. 2017-110493 filed on Jun. 2, 2017, the entire contents of which are hereby incorporated by reference.

BACKGROUND

1. Technical Field

The present invention relates to an apparatus for vehicle-mounted camera calibration and a method for vehicle-mounted camera calibration, which are used for vehicle-mounted camera calibration performed at a vehicle manufacturing plant, a vehicle maintenance facility, or the like for automobiles.

2. Related Art

When a vehicle-mounted camera is installed into an automobile, calibration processing that acquires information on an installation angle of the camera is necessary to correct for errors in the position of the optical axis of the camera with respect to the position specified in the design (for example, refer to Japanese Unexamined Patent Application Publication (JP-A) No. 2013-131885). According to JP-A No. 2013-131885, vehicle-mounted camera calibration is performed in the following manner. An automobile is stopped at a predetermined position in the workshop where a plurality of board-like indicators are placed on the floor in advance, and vehicle-mounted cameras capture images of the surrounding area of the automobile, which include marks on the plurality of board-like indicators. Then, the vehicle-mounted camera calibration is performed by using the images captured by the vehicle-mounted cameras.

SUMMARY OF THE INVENTION

According to an aspect of the present invention, there is provided an apparatus for vehicle-mounted camera calibration that includes a floor on which an automobile is to be stopped in a predetermined stopping area and a display that is disposed outside the predetermined stopping area on the floor. The display is configured to present a display pattern for calibration of a vehicle-mounted camera mounted in the automobile. The display is configured to change the display pattern in accordance with specifications of the automobile and specifications of the vehicle-mounted camera.

DETAILED DESCRIPTION

Figure 1:
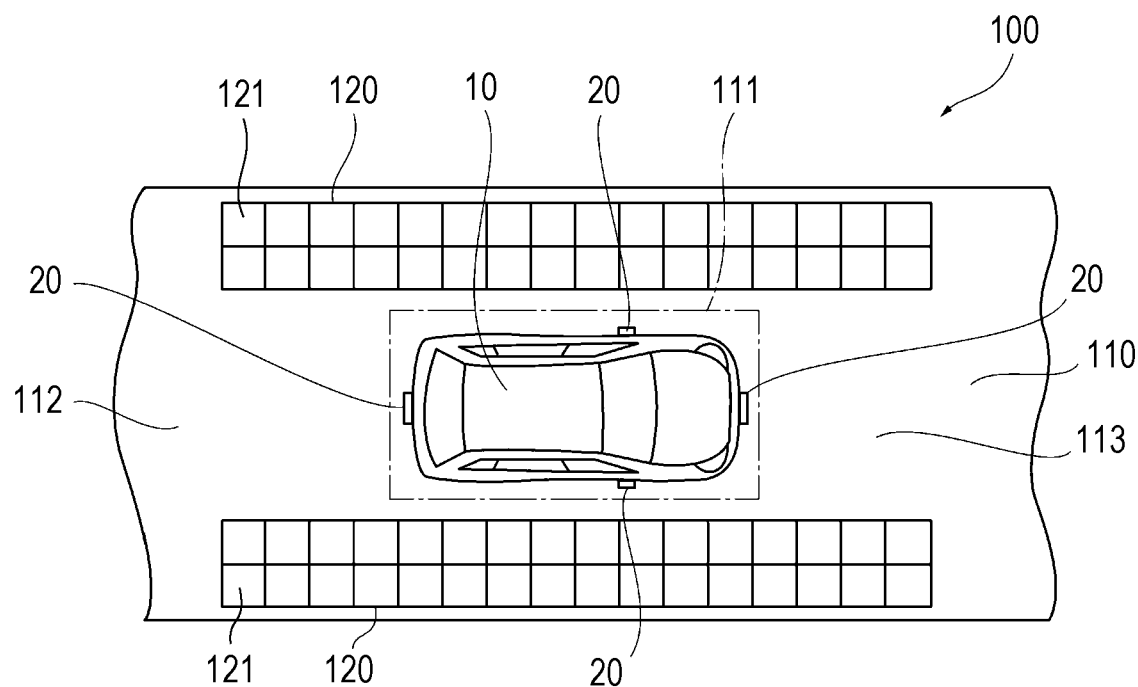
FIG. 1 is an illustration depicting an arrangement of an automobile and displays in a calibration process according to an example of the present invention.

In the following, a preferred but non-limiting example of the invention is described in detail with reference to the accompanying drawings. Note that sizes, materials, specific values, and any other factors illustrated in the example are illustrative for easier understanding of the invention, and are not intended to limit the scope of the invention unless otherwise specifically stated. Further, elements in the following example which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the invention are unillustrated in the drawings.

In a calibration apparatus, indicator marks are determined in accordance with specific specifications of vehicles and cameras. If vehicles or cameras with different specifications coexist in a manufacturing plant, a maintenance facility, or the like, indicator marks need to be changed every time different specifications are handled. Thus, if there is only one line for the calibration process, vehicles waiting for the calibration process cause congestion of the line. Although setting up a line for each set of vehicle specifications is conceivable, a vast amount of space is necessary to maintain many lines, and distributing vehicles to each line in accordance with the specifications is also necessary, resulting in lower operation efficiency as a whole.

It is desirable to provide an apparatus for vehicle-mounted camera calibration and a method for vehicle-mounted camera calibration which enable smooth calibration of vehicle-mounted cameras in a limited number of lines even when vehicles or cameras having different specifications coexist.

Figure 2:
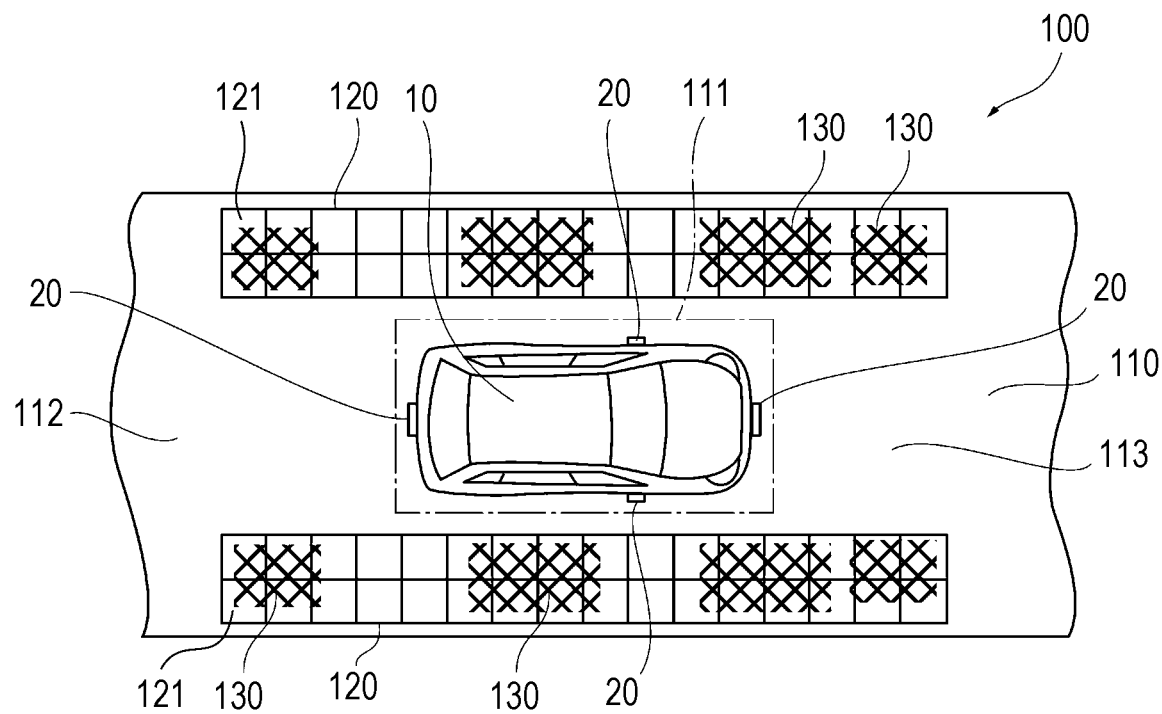
FIG. 2 is an illustration depicting a state in which display patterns are presented on the displays.
Figure 3:
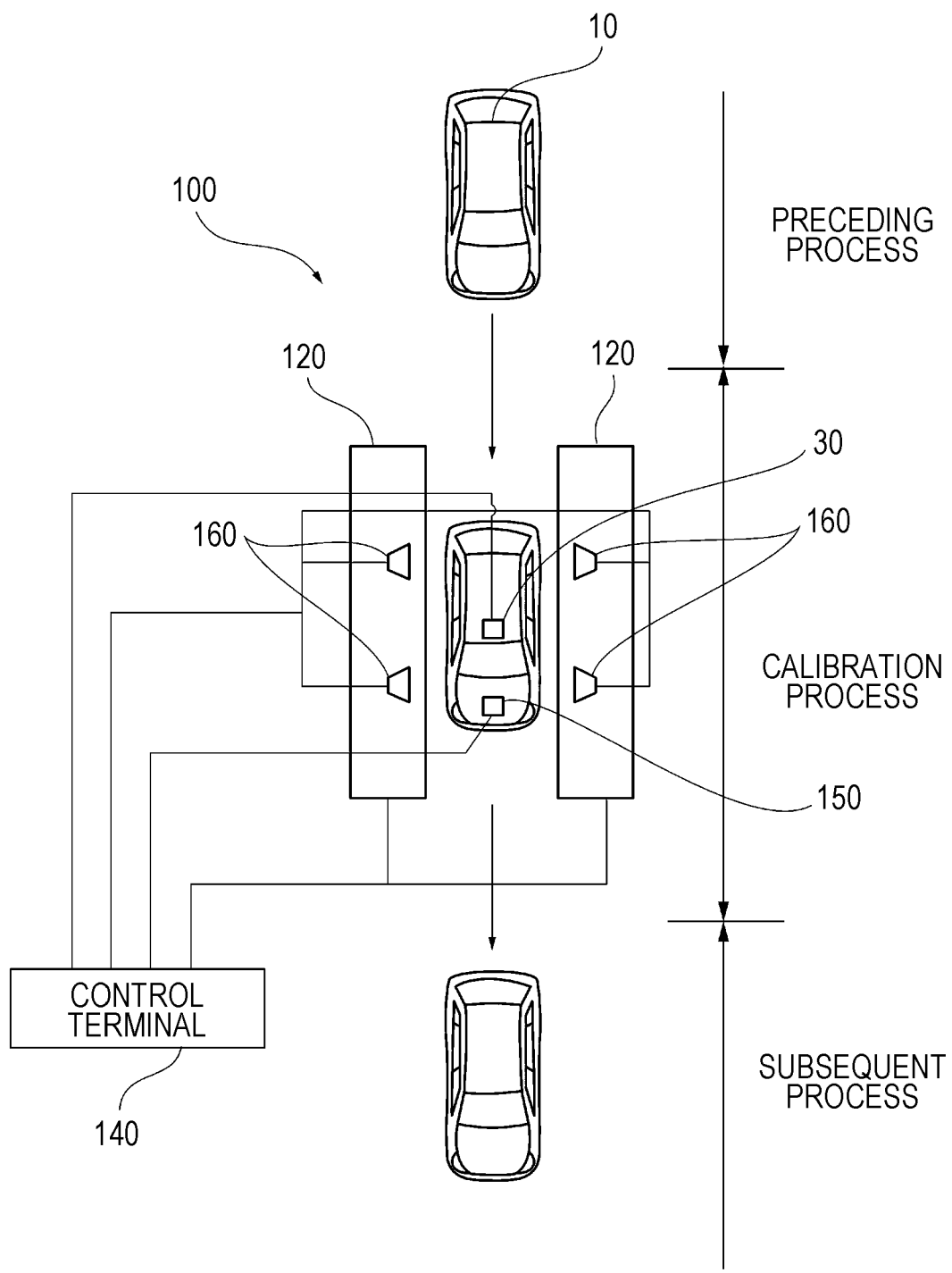
FIG. 3 depicts a schematic configuration of an apparatus for vehicle-mounted camera calibration.
Figure 4:
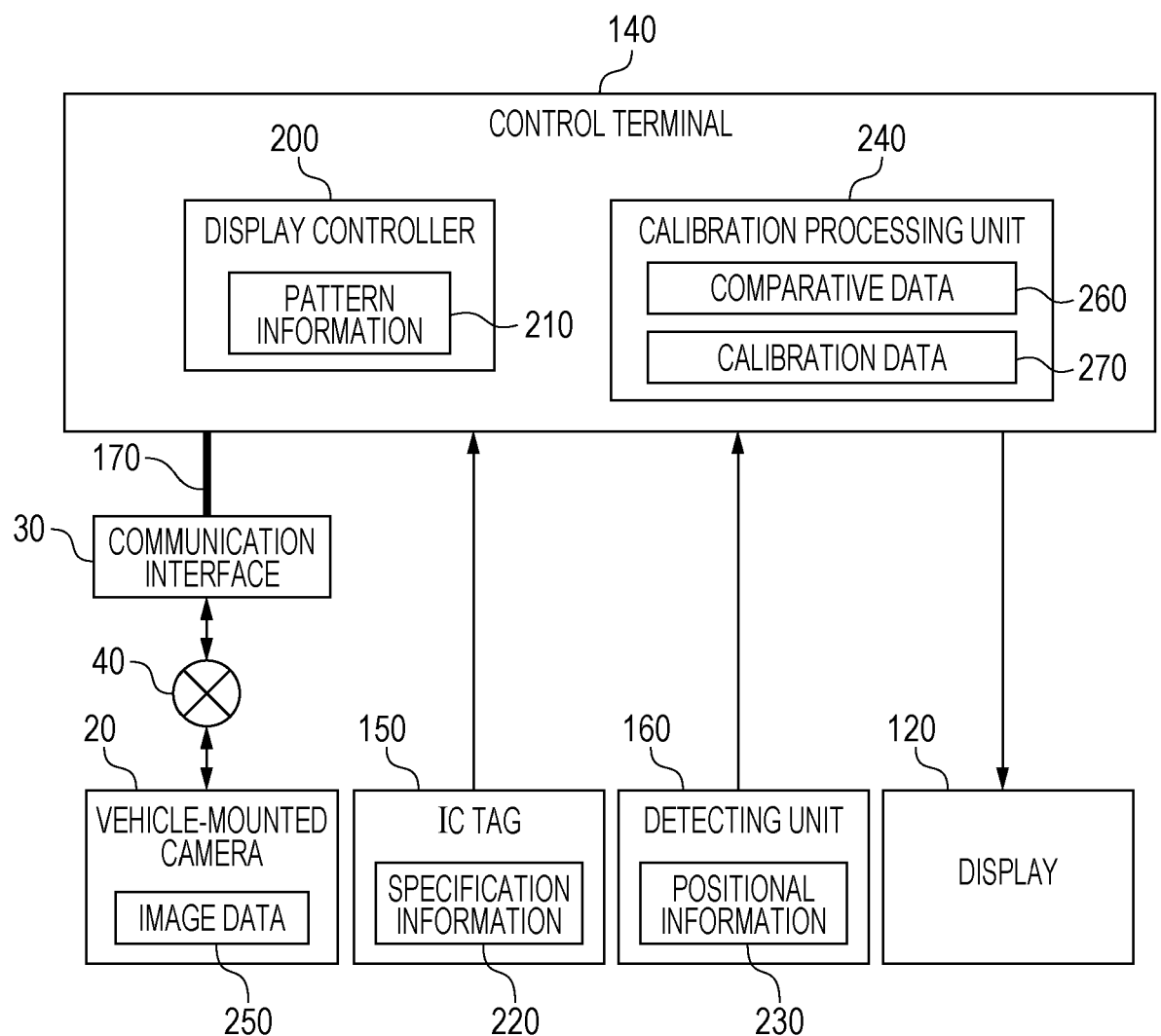
FIG. 4 is a block diagram illustrating an outline of the apparatus for vehicle-mounted camera calibration.
Figure 5:
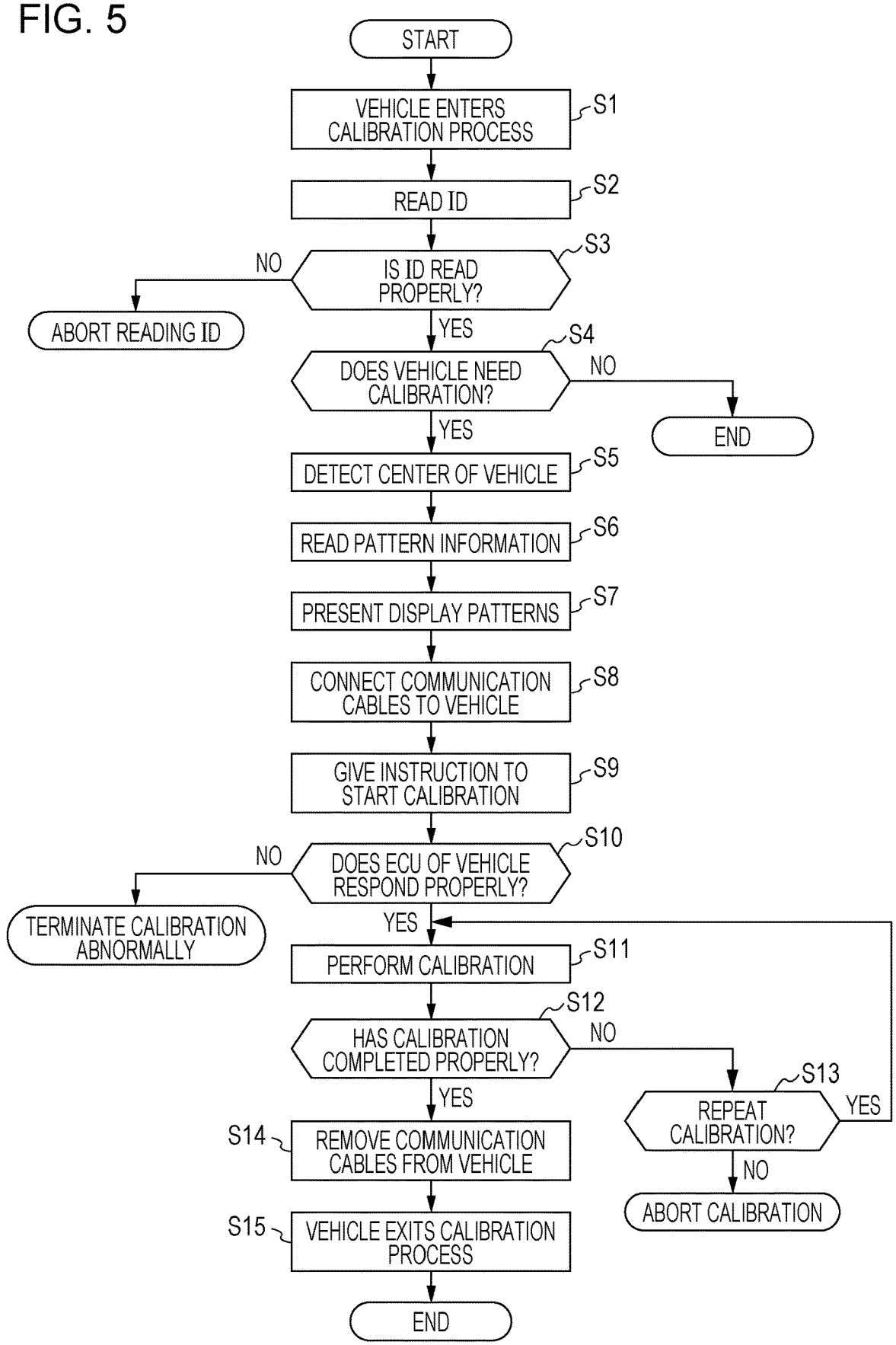
FIG. 5 is a flowchart depicting a method for vehicle-mounted camera calibration.

FIGS. 1 to 5 depict an example of the present invention. FIG. 1 is an illustration depicting an arrangement of an automobile and displays in a calibration process according to the example of the present invention. FIG. 2 is an illustration depicting a state in which display patterns are presented on the displays. FIG. 3 depicts a schematic configuration of an apparatus for vehicle-mounted camera calibration. FIG. 4 is a block diagram illustrating an outline of the apparatus for vehicle-mounted camera calibration. FIG. 5 is a flowchart depicting a method for vehicle-mounted camera calibration.

As depicted in FIG. 1, a calibration apparatus 100, which is installed in a line of a vehicle manufacturing plant, includes a floor 110 on which an automobile 10 is stopped in a predetermined stopping area 111 and displays 120 disposed outside the stopping area 111 on the floor 110. Different models of automobiles 10 are handled on the line, and vehicle-mounted cameras 20 are optionally mounted depending on a grade or the like of the automobile 10. FIG. 1 depicts the automobile 10 with the vehicle-mounted cameras 20 mounted at four positions in total, that is, on the front, the rear, the left side, and the right side thereof. Any material may be used for the floor 110 as long as the automobile 10 can move on the floor 110, and, for example, concrete or iron boards may be used. In this example, a space behind the stopping area 111 on the floor 110 constitutes an entry path 112 of the automobile 10, and a space in front of the stopping area 111 constitutes an exit path 113. In short, the automobile 10 enters from behind the stopping area 111 and exits from front. The displays 120 are disposed in a space that does not include the entry path 112 or the exit path 113 and thus need not have strength to bear the weight of the automobile 10.

As depicted in FIG. 2, in this example, the displays 120 are disposed outside the stopping area 111 on the left and right sides in a rectangular shape that is elongated in the front-rear direction and that has a predetermined size in the left-right direction. The displays 120 present display patterns 130 for calibration of each vehicle-mounted camera 20. The display patterns 130 are changed in accordance with specifications of the automobiles 10 and specifications of the vehicle-mounted cameras 20. Although any configuration of the displays 120 may be used, a plurality of light emitting diode (LED) panels 121 are arranged consecutively in the front-rear direction and the left-right direction in this example.

As depicted in FIG. 3, the calibration apparatus 100 includes a control terminal 140 connected to the displays 120 wirelessly or with cables. An integrated circuit (IC) tag 150 is attached to the automobile 10 that moves on the line, and the control terminal 140 is capable of communicating with the IC tag 150 wirelessly. The calibration apparatus 100 also includes a detecting unit 160 that detects a stopping position of the automobile 10 in the stopping area 111. The detecting unit 160 may have any configuration. For example, the detecting unit 160 may include ultrasonic sensors. The control terminal 140 can be connected to a communication interface 30 of the automobile 10 with communication cables 170.

As depicted in FIG. 4, the control terminal 140 includes a display controller 200 that is connected to the displays 120 and that causes the displays 120 to present the display patterns 130 corresponding to the specifications of the automobile 10 and the specifications of the vehicle-mounted camera 20. A plurality of pieces of pattern information 210 relating to the display patterns 130 are stored in the display controller 200. Each of the plurality of pieces of pattern information 210 is associated with specification information 220 relating to the specifications of the automobile 10 and the specifications of the vehicle-mounted camera 20. The specification information 220 includes information relating to model of the automobile 10 subject to calibration processing, and presence or absence, kind, mounting position, and the like of the vehicle-mounted camera 20. The specification information 220 is transmitted to the control terminal 140 from outside. In this example, the IC tag 150 attached to the automobile 10 stores the specification information 220 as unique vehicle identification (ID), and the specification information 220 is transmitted to the control terminal 140 wirelessly.

Positional information 230 relating to the stopping position detected by the detecting unit 160 is transmitted to the control terminal 140 wirelessly or via a cable. The display controller 200 adjusts display positions of the display patterns 130 on the displays 120 in accordance with the transmitted positional information 230. Specifically, the display controller 200 causes the displays 120 to present the display patterns 130 at positions corresponding to the stopping position of the automobile 10.

The control terminal 140 includes a calibration processing unit 240 that performs calibration of each of the vehicle-mounted cameras 20. The control terminal 140 is connected to the communication interface 30 of an in-vehicle network 40 of the automobile 10 with the communication cables 170 and is capable of communicating with the vehicle-mounted camera 20 via the communication cables 170 and the in-vehicle network 40. Image data 250 obtained by the vehicle-mounted camera 20 is transmitted to the control terminal 140 via the in-vehicle network 40 and the communication cables 170. The control terminal 140 retains comparative data 260 relating to the display patterns 130, compares the image data 250 with the comparative data 260, and calculates the calibration data 270. The calculated calibration data 270 is transmitted to the vehicle-mounted camera 20 via the communication cables 170 and the in-vehicle network 40, and the calibration of the vehicle-mounted camera 20 is performed.

Calibration procedures performed by the calibration apparatus 100 configured as described above will be described with reference to the flowchart in FIG. 5. In a vehicle manufacturing plant, the automobile 10 is driven to enter the calibration process from the preceding process and is stopped in the stopping area 111 (step S1). At this time, the vehicle-mounted cameras 20 mounted in the automobile 10 are not calibrated and remain in the initial setting.

Then, the IC tag 150 attached to the automobile 10 is read, and the vehicle ID is acquired as the specification information 220 (step S2). Further, it is determined whether the acquired vehicle ID is read properly (step S3). If the acquired vehicle ID is not read properly, reading processing of the vehicle ID is terminated. It is determined that the vehicle ID is not read properly if the reading processing of the vehicle ID does not succeed, for example, five times or more because the IC tag 150 is not attached to the automobile 10, the IC tag 150 is malfunctioning, or the like.

When the vehicle ID is read properly in step S3, it is determined whether the automobile 10 is a vehicle that needs calibration of the vehicle-mounted cameras 20 (step S4). If it is determined that the calibration is not necessary, the process is terminated without performing the calibration. It is determined that the calibration is not necessary, for example, if no vehicle-mounted camera 20 is mounted or performance required for the vehicle-mounted cameras 20 is realized without calibration.

If it is determined in step S4 that the calibration is necessary, the detecting unit 160 acquires the positional information 230 of the automobile 10 and detects the reference position of the automobile 10 (step S5). Subsequently, the pattern information 210 associated with the acquired specification information 220 is read (step S6), and the display patterns 130 are presented on the displays 120 in accordance with the pattern information 210 (step S7). The positions of the display patterns 130 on the displays 120 are adjusted in accordance with the positional information 230.

Next, the in-vehicle network 40 of the automobile 10 is connected to the control terminal 140 via the communication cables 170 (step S8). Then, the calibration processing unit 240 starts the calibration (step S9). When the calibration is started, it is determined at the beginning whether the engine control unit (ECU) of the automobile 10 responds (step S10). If the ECU does not respond, the calibration is terminated. It is determined that the ECU does not respond if the communication with the ECU does not succeed, for example, five or more times due to the communication cables 170 being disconnected or the like.

If the response from the ECU is confirmed in step S10, calibration processing of the vehicle-mounted camera 20 is performed (step S11). After the calibration processing is finished, it is determined whether the calibration has been completed properly (step S12). If the calibration has not been completed properly, it is determined whether an instruction input to repeat the calibration processing has been received or an instruction input not to repeat the calibration processing has been received from a user or the like via an operation unit or the like (step S13). The calibration has not been completed properly, for example, in a case where the display patterns 130 are not properly recognized by the vehicle-mounted cameras 20 due to an obstacle or the like on the displays 120 or in a case where the communication condition via the communication cables 170 becomes unstable during the calibration. If the instruction input to repeat the calibration processing is received, the process returns to step S11, and the calibration processing is performed again. If the instruction input not to repeat the calibration processing is received, the calibration processing is terminated.

When the calibration has been completed properly in step S11, an operator or the like removes the communication cables 170 from the automobile 10 (step S14), and the automobile 10 is driven to enter the subsequent process (step S15).

As described above, according to this example, the calibration of the vehicle-mounted cameras 20 is performed by presenting the display patterns 130 on the displays 120 while the automobile 10 remains stopped in the stopping area 111 on the floor 110. Because the display patterns 130 can be changed in accordance with the specifications of the automobile 10 and the specifications of the vehicle-mounted camera 20, the display patterns 130 corresponding to the specifications can be presented for the individual automobiles 10, even if the automobiles 10 having different specifications enter the calibration process consecutively. Specifically, the display controller 200 causes the displays 120 to present the display patterns 130 corresponding to the specifications of the automobile 10 and the specifications of the vehicle-mounted camera 20. Accordingly, even if vehicles and cameras with different specifications are present, the calibration of the vehicle-mounted cameras 20 can be performed smoothly by using a limited number of lines.

Although the displays 120 are disposed outside the stopping area 111 only on the left and right sides of the stopping area 111 in the example described above, the displays 120 may be disposed in front of and behind the stopping area 111 in addition to the outside areas on the left and right. This increases the calibration accuracy of the vehicle-mounted cameras 20.

An example of the present invention has been described, but the example described above is not intended to limit the present invention. It is to be noted that not all of the features are necessary to constitute a solution.

The invention claimed is:

1. An apparatus for vehicle-mounted camera calibration, the apparatus comprising:
   a floor on which a vehicle is to be stopped in a predetermined stopping area,
   a display controller configured to:
      receive first specification information of the vehicle from the vehicle;
      determine a display pattern for calibration of a vehicle-mounted camera mounted in the vehicle based on second specification information of the vehicle-mounted camera and the first specification information, the second specification information including information relating to at least one of (i) kind of the vehicle-mounted camera and (ii) mounting position of the vehicle-mounted camera; and
      instruct a display to display the display pattern,
   wherein the display is disposed outside the predetermined stopping area on the floor, and the display is configured to present the display pattern for calibration of the vehicle-mounted camera mounted in the vehicle.

2. The apparatus for vehicle-mounted camera calibration according to claim 1, wherein
   at least one of a space in front of the predetermined stopping area on the floor or a space behind the predetermined stopping area on the floor constitutes an entry path and an exit path of the vehicle, and
   the display is disposed in a space that does not include the entry path or the exit path on the floor.

3. The apparatus for vehicle-mounted camera calibration according to claim 2, wherein
   the space behind the predetermined stopping area on the floor constitutes the entry path and the space in front of the predetermined stopping area on the floor constitutes the exit path, and
   the display is disposed outside the predetermined stopping area on the left and right sides of the predetermined stopping area on the floor.

4. The apparatus for vehicle-mounted camera calibration according to claim 1, further comprising a detecting unit configured to detect a stopping position of the vehicle in the predetermined stopping area and transmit positional information relating to the stopping position to the display controller, wherein
   the display controller adjusts a display position of the display pattern on the display in accordance with the positional information.

5. The apparatus for vehicle-mounted camera calibration according to claim 2, further comprising a detecting unit configured to detect a stopping position of the vehicle in the predetermined stopping area and transmit positional information relating to the stopping position to the display controller, wherein
   the display controller adjusts a display position of the display pattern on the display in accordance with the positional information.

6. The apparatus for vehicle-mounted camera calibration according to claim 3, further comprising a detecting unit configured to detect a stopping position of the vehicle in the predetermined stopping area and transmit positional information relating to the stopping position to the display controller, wherein
   the display controller adjusts a display position of the display pattern on the display in accordance with the positional information.

7. A method for vehicle-mounted camera calibration using the apparatus for vehicle-mounted camera calibration according to claim 1, the method comprising:
   acquiring the first specification information and the second specification information and the specifications of the vehicle-mounted camera; and
   presenting the display pattern corresponding to the acquired specification information on the display.

8. The method for vehicle-mounted camera calibration according to claim 7, further comprising:
   detecting a stopping position of the vehicle in the predetermined stopping area; and
   adjusting a display position of the display pattern on the display in accordance with the detected stopping position.

9. The apparatus for vehicle-mounted camera calibration according to claim 1, wherein the display includes a plurality of light emitting diode panels.

10. The apparatus for vehicle-mounted camera calibration according to claim 1, wherein the display controller is configured to determine the display pattern further based on third specification information of the vehicle, the third specification information including information relating to model of the vehicle.

11. The apparatus for vehicle-mounted camera calibration according to claim 1,
wherein the display controller is configured to receive the first specification information from an integrated circuit tag attached to the vehicle.

12. The apparatus for vehicle-mounted camera calibration according to claim 1,
wherein the first specification information indicates information for identifying the vehicle.

13. The apparatus for vehicle-mounted camera calibration according to claim 1, wherein the display controller stores a plurality of pieces of pattern information relating to the display patterns, and wherein each of the plurality of pieces of pattern information is associated with specification information relating to the specifications of the vehicle and the specifications of the vehicle-mounted camera.

14. The apparatus for vehicle-mounted camera calibration according to claim 13, wherein the display controller determines the display pattern by selecting one or more pieces of pattern information that corresponds to the specification of the vehicle and the specification of the vehicle-mounted camera.

15. The apparatus for vehicle-mounted camera calibration according to claim 1, wherein the first specification of the vehicle includes information relating to model of the vehicle.

16. The apparatus for vehicle-mounted camera calibration according to claim 1, wherein the second specification information includes information relating to kind of the vehicle-mounted camera.

* * * * *